United States Patent
McCulfor

(10) Patent No.: US 9,261,139 B2
(45) Date of Patent: Feb. 16, 2016

(54) FRICTION-REDUCING GEOMETRIC SURFACE FEATURE

(71) Applicant: Trelleborg Sealing Solutions US, Inc., Fort Wayne, IN (US)

(72) Inventor: Timothy J. McCulfor, Fort Wayne, IN (US)

(73) Assignee: Trelleborg Sealing Solutions US, Fort Wayne, IN (US)

( * ) Notice: Subject to any disclaimer, the term of this patent is extended or adjusted under 35 U.S.C. 154(b) by 0 days.

(21) Appl. No.: 14/174,388

(22) Filed: Feb. 6, 2014

(65) Prior Publication Data

US 2014/0219588 A1      Aug. 7, 2014

Related U.S. Application Data

(60) Provisional application No. 61/761,534, filed on Feb. 6, 2013.

(51) Int. Cl.
| | |
|---|---|
| *F16C 33/00* | (2006.01) |
| *F16J 15/00* | (2006.01) |
| *F16C 29/02* | (2006.01) |
| *F16J 15/16* | (2006.01) |
| *F16C 29/08* | (2006.01) |
| *F16C 33/10* | (2006.01) |
| *F16C 33/20* | (2006.01) |
| *F16C 33/74* | (2006.01) |

(52) U.S. Cl.
CPC .............. *F16C 29/02* (2013.01); *F16C 29/084* (2013.01); *F16C 33/1075* (2013.01); *F16C 33/20* (2013.01); *F16J 15/16* (2013.01); *F16J 15/162* (2013.01); *F16C 33/74* (2013.01); *F16C 2208/32* (2013.01); *F16C 2240/30* (2013.01)

(58) Field of Classification Search
CPC .. F16J 15/3244; F16J 15/162; F16C 33/1075; F16C 33/20; F16C 33/74; F16C 2240/30
USPC ............... 384/26, 42, 130; 277/549, 500, 559
See application file for complete search history.

(56) References Cited

U.S. PATENT DOCUMENTS

| | | | |
|---|---|---|---|
| 2,241,789 A | | 5/1938 | Queneau et al. |
| 3,150,940 A | | 9/1964 | Graves |
| 3,929,340 A | * | 12/1975 | Peisker .................... 277/559 |
| 3,945,893 A | | 3/1976 | Ishimori et al. |
| 4,047,984 A | | 9/1977 | Belke et al. |
| 4,973,068 A | | 11/1990 | Lebeck |
| 5,190,299 A | * | 3/1993 | Johnston .................... 277/559 |

(Continued)

OTHER PUBLICATIONS

Notification of Transmittal of the International Search Report and the Written Opinion of the International Searching Authority, or the Declaration dated Jun. 16, 2014 for International Application No. PCT/US2014/015069 (13 pages).

*Primary Examiner* — Adam D Rogers
(74) *Attorney, Agent, or Firm* — Taylor IP, P.C.

(57) ABSTRACT

A sealing or bearing structure for sealing or separating moving surfaces is provided. The sealing or bearing structure includes a main body that defines a body axis going through the main body. A contact surface is configured to slidingly contact another surface, such as a rod, and defines a contact axis that is parallel to the body axis. At least one geometric surface feature, such as a shaped edge, is located between the body axis and the contact axis. The geometric surface feature has an entry angle that is less than 5 degrees relative to the contact axis.

6 Claims, 6 Drawing Sheets

(56) References Cited

U.S. PATENT DOCUMENTS

| | | |
|---|---|---|
| 5,427,387 A * | 6/1995 | Johnston ............... 277/559 |
| 5,433,452 A | 7/1995 | Edlund et al. |
| 5,632,559 A | 5/1997 | Kumada et al. |
| 5,704,720 A | 1/1998 | Kumada et al. |
| 5,735,531 A * | 4/1998 | Jordan ............... 277/500 |
| 5,834,094 A | 11/1998 | Etsion et al. |
| 6,561,520 B2 * | 5/2003 | Kalsi et al. ............... 277/559 |
| 6,685,194 B2 * | 2/2004 | Dietle et al. ............... 277/559 |
| RE39,377 E | 11/2006 | Kumada et al. |
| 8,123,413 B2 | 2/2012 | Tambe et al. |
| 8,209,831 B2 | 7/2012 | Boehm et al. |
| 8,348,281 B2 * | 1/2013 | Yoshida et al. ............... 277/562 |
| 2001/0045704 A1 | 11/2001 | Kalsi et al. |
| 2002/0084593 A1 | 7/2002 | Baehl et al. |
| 2005/0035556 A1 | 2/2005 | Lang et al. |
| 2005/0073110 A1 * | 4/2005 | Armour et al. ............... 277/549 |
| 2008/0272552 A1 | 11/2008 | Zheng et al. |

* cited by examiner

FRICTION-REDUCING GEOMETRIC SURFACE FEATURE

CROSS REFERENCE TO RELATED APPLICATIONS

This is a non-provisional application based upon U.S. provisional patent application Ser. No. 61/761,534, entitled "FRICTION-REDUCING GEOMETRIC SURFACE FEATURE", filed Feb. 6, 2013, which is incorporated herein by reference.

BACKGROUND OF THE INVENTION

1. Field of the Invention

The present invention relates to bearings and seals, and, more particularly, to geometric surface features of bearings and seals and their mating surfaces.

2. Description of the Related Art

A seal is a structure included in devices to prevent media from flowing past the seal into other areas of the device. Seals come in a great variety of shapes and sizes, depending on their intended application(s). When seals are used to seal areas with moving parts (dynamic seals), friction between the seal and the moving part(s) are of concern. Friction caused by a moving surface that is in contact with the seal can cause the seal's sealing surface to abrade away, which can lead to premature failure of the seal. Likewise, bearings are used to prevent two moving parts from being in contact with each other. Friction can also cause the bearing's sealing surface to abrade away, which can lead to premature failure of the seal. In addition, too much friction with a seal or bearing results in excessive heat and resulting degradation of system performance. To counteract this problem, lubricants are provided between the seal or bearing and the moving surface to reduce the frictional forces by acting as a fluid separation. However, during operation, the lubricants don't always stay in place or form an adequate separation between the seal or bearing and the moving surface.

The prior art describes different surface texturing designs which are engineered to provide oil lubricant pockets, and various friction results (higher and lower) have been reported. Typical lubricant pocket designs provide evenly spaced rectangular or round pockets of varying size and density on one of the surfaces in contact.

What is needed in the art is an improved way of reducing friction between a seal and a moving surface.

SUMMARY OF THE INVENTION

The present invention provides a geometric surface feature with a low entry angle which can reduce the friction between a seal or bearing and a moving surface.

The invention in one form is directed to a sealing or bearing structure for sealing or separating moving surfaces including a main body, a contact surface and at least one geometric surface feature. The main body defines a body axis running therethrough. The contact surface is configured to slidingly contact another surface, such as a rod, and defines a contact axis that is parallel to the body axis of the main body. The geometric surface feature is located between the body axis and the contact axis and has an entry angle that is less than 5 degrees relative to the contact axis.

The invention in another form is directed to a sealing or bearing pad including a contact surface that is configured for slidingly contacting another surface and defines a contact axis. Multiple pockets are formed on the contact surface, each pocket having a first side, a second side and a bottom defining a pocket axis that is parallel to the contact axis. The first side and/or second side includes a geometric surface feature between the contact axis and the pocket axis that has an entry angle less than 5 degrees relative to the contact axis.

The invention in another form is directed to a housing with at least one housing groove formed in the housing and at least one sealing or bearing structure placed within the housing groove adjacent to another surface, such as a rod. The sealing or bearing structure includes a main body, a contact surface, and at least one geometric surface feature. The main body defines a body axis therethrough. The contact surface is configured for slidingly contacting the rod surface and defines a contact axis that is parallel to the body axis of the main body. The geometric surface feature is located between the body axis and the contact axis and has an entry angle that is less than 5 degrees relative to the contact axis.

An advantage of the present invention is that a low entry angle provides an unexpected and substantial reduction in friction between moving surfaces. As a result of achieving reduced friction, the present invention thus advantageously provides, for example, wear reduction of either or both of the moving surfaces, lower energy consumption (and the by-products of such lower energy use and less heat generation), and lower operating cost.

Another advantage is the present invention provides a hydrodynamic fluid film which is maintained in boundary conditions by the surface geometry modification of an object, such as a seal or a bearing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
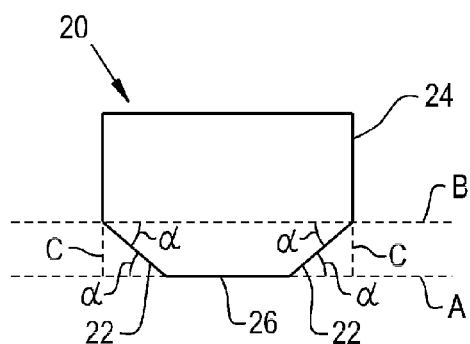
FIG. 1 is a schematic side view of a pillar according to the present invention.

Referring now to the drawings, and more particularly to FIG. 1, there is shown a structure 20 with a friction-reducing geometric surface feature 22. The structure 20 in FIG. 1 is a pillar that projects downwardly, the free end of the pillar 20 being shown in FIG. 1. While the pillar 20 of FIG. 1 is shown projecting downwardly, the pillar 20 could just as well be projecting upwardly.

The pillar 20 in FIG. 1 can be a cylindrical structure, thus having a substantially circular cross-section. However, according to other embodiments of the present invention, the pillar 20 can have any one of several different cross-sectional shapes (including, but not limited to, square or rectangular cross-sectional shapes). FIG. 1 shows that the cylindrical pillar 20 has a vertical wall 24 and a planar face 26 on the free end of the pillar, the planar face 26 being formed by wall 26.

The friction-reducing geometric surface feature 22 of the pillar 20 in FIG. 1 is a chamfered edge around the circumference of the free end of the pillar 20. More specifically, according to the present invention, the chamfered edge 22 (which can be referred to simply as a chamfer) has a chamfer angle α of less than 5 degrees. FIG. 1, as well as the other figures, shows the angle α to be greater than 5 degrees for illustrative purposes; however, it is understood that the chamfer angle α is actually less than 5 degrees (for example, but not by way of limitation, less than or equal to 2 degrees). As shown in FIG. 1, angle α is measured between a horizontal line in FIG. 1 and the chamfered edge 22. More specifically, two planes A and B, which are parallel to one another, are shown in FIG. 1 by dashed straight lines, the distal surface of the pillar 20 being formed by wall 26 of the pillar 20 and being coplanar with plane A. If the chamfered edge 22 were not formed on the pillar 20, then the pillar 20 would have the form of a cylinder with sharp edges (right angle edges), as indicated by broken lines C which intersect plane A (part of the cornered edge of the cylinder being formed by plane A). In application, the pillar 20 is mounted to, attached to, or formed as a part of another structure (for example, a seal or bearing), and this other structure is in a sliding relationship with yet another structure, a lubricant being between both structures. The friction-reducing geometric surface feature 22 (for example, the chamfered edge 22 with the low angle α) substantially and unexpectedly (as explained below) reduces the friction between both surfaces. One possible theory to explain this reduction in friction is that the fluid (the lubricant) under reciprocating conditions tends to "lift" the surface (keep a thicker fluid film for low friction and wear) at lower entry angles.

Figure 8:
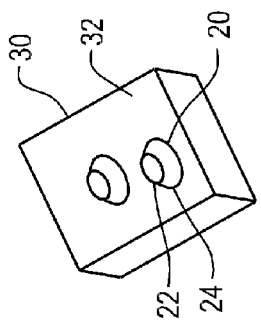
FIG. 8 is a schematic perspective view of a pad with a pillar according to the present invention.

By way of example and not by way of limitation, the pillar 20 of FIG. 1 can be placed on a pad (for example, a flat bearing pad). FIG. 8 shows one example of a pad 30 with pillars 20 according to the present invention. The pillars 20 in FIG. 8 show the chamfered edge 22 starting at a surface 32 of the pad 30. That is, viewing FIGS. 1 and 8 together, the pillar 20 of FIG. 8 starts at plane B of FIG. 1 and omits the wall 24 of FIG. 1 (although the pillar 20 can optionally have the wall 24, wall 24 optionally being inserted in a pocket (not shown) in the pad 30 during manufacture). The pad 30 can have a plurality of contact points in a predetermined area and thus have multiple contact points. The pad 30 with the pillar 20 can reciprocate back-and-forth (while the other structure remains stationary), or the other structure (not shown) in sliding relationship with the pad 30 can reciprocate back-and-forth (while the pad 30 remains stationary), or both the pad 30 and this other structure can reciprocate back-and-forth.

Figure 2:
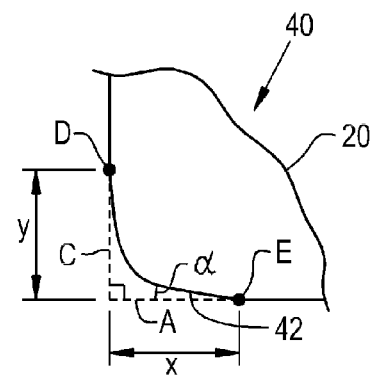
FIG. 2 is a schematic side view of a pillar according to the present invention, with portions broken away.
Figure 3:
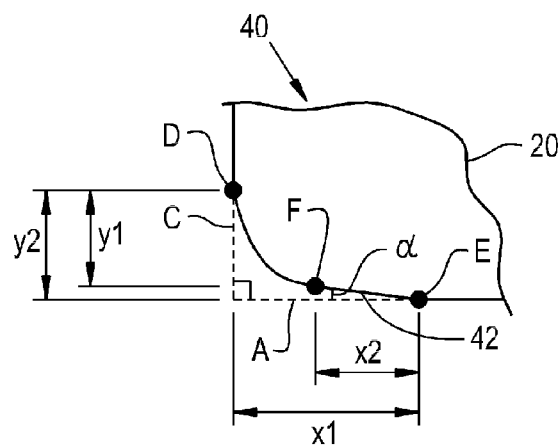
FIG. 3 is a schematic side view of a pillar according to the present invention, with portions broken away.

FIGS. 2 and 3 also show portions 40 of pillars 20 which are generally cylindrical structures. The portion 40 of the pillars 20 shown in FIGS. 2 and 3 is a lower left portion (which would correspond to the lower left portion in FIG. 1). Further, the portions 40 in FIGS. 2 and 3 have a friction-reducing geometric surface feature 42 which is a domed or crowned surface. Generally speaking, while the friction-reducing surface feature 42 is straight in FIG. 1, the domed/crowned surface 42 ("domed" and "crowned" are used interchangeably herein) is curved on the edges, rather than being straight. Stated another way, rather than providing a chamfered edge, the edge is curved (and thus has a single radius or a blended radius (two or more segments with different radiuses)). Even with a curve, the curve approximates the chamfer angle α of less than 5 degrees. Stated another way, the angle α, which can be referred to as an entry angle (or a departure angle, depending upon the perspective, or a convergence angle, this terminology being used interchangeably herein), is less than 5 degrees. FIG. 2 shows a symmetrical curved edge, and FIG. 3 shows an asymmetrical curved edge. Regardless of whether the curve is symmetrical or asymmetrical, the curve can have one or more radiuses extending between two points on the pillar. A symmetrical curve means that the curve has an axial extent which is equal to the radial extent. On the other hand, an asymmetrical curve means that the curve has an axial extent which is not equal to the radial extent. FIGS. 2 and 3 show the curves extending between points D and E; above point D the surface can be a straight line, and to the right of point E the surface can be planar (on the other hand, to the right of point E, the surface can begin an ascent mirroring the ascent from points E to D). In other words, point D can be at the edge, and point E can be the point where the transition is made to a plane. Planes A and C are also shown in FIGS. 2 and 3. The surface of the curve approaching point E closely approximates an entry angle α of less than 5 degrees.

According to one embodiment of the present invention (which is provided by way of example and not by way of limitation), FIG. 3 can be understood to have an entry angle α (the convergence angle) of less than 5 degrees. The x distance in FIG. 3 can be in the range of 0.005 inches to 0.100 inches as the minimum. When angle α is less than 5 degrees, the ratio of $y_1$ to $x_1$ from points D to E can be less than or equal to 0.087, and the ratio of $y_2$ to $x_2$ from points F (the midpoint along xi) to E can be greater or equal to 0.025. Alternatively, when angle α is less than 2 degrees, the ratio of $y_1$ to $x_1$ from points D to E can be less than or equal to 0.035, and the ratio of $y_2$ to $x_2$ from points F (the midpoint along $x_1$) to E can be greater or equal to 0.01. The start of the plane at point E is smooth; in other words, no evidence of a line or other feature exists at point E which would indicate an abrupt transition from the curve to the planar surface at point E.

The friction-reducing geometric surface features 22, 42 of the present invention can be formed on, for example, a pad or other parts, such as seals or bearings. The parts on which these surface features 22, 42 are formed can be made of rubber, plastic, or the like; these materials are provided by way of example and not by way of limitation. These friction-reducing geometric surface features 22, 42 can be formed as projections (such as the cylindrical pillars in FIGS. 1-3, or projections of a different shape).

Figure 4:
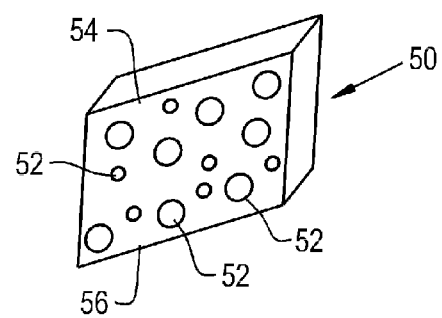
FIG. 4 is a schematic perspective view of a pad with a plurality of pockets according to the present invention.

Alternatively, these friction-reducing geometric surface features can be formed as pockets in a surface. FIG. 4 shows a schematic view of a structure 50, such as a pad for example, that includes a plurality of lubricant pockets 52. The pockets 52 can hold a lubricant which helps to reduce friction between the raised structures between the pockets 52 and an opposing surface. The pockets 52 can be formed in the pad 50 according to a pattern, which can be a symmetrical pattern; alternatively, the pockets 52 can be formed in the pad 50 in a random manner and can be asymmetrically arranged. Thus, a seal or bearing surface can be formed with valleys or craters which serve as pockets for lubricants. When a load is placed on the surface, the edges of the pockets (formed without the rounded or chamfered edge of the present invention) can tend to scrape the fluid film formed on the surface and thus increase the friction or decrease the fluid film thickness between this surface and an opposing surface (these surfaces sliding relative to one another). However, according to the present invention, these pockets/valleys 52 can be formed to have top edges which have the friction-reducing geometric surface features 22, 42 according to the present invention. Further, rather than having pockets 52, a pillared surface can be formed which helps to create a filmed surface (since there is a finite amount of oil to spread between the sliding surfaces), and thus pockets 52 would not be necessary, the filmed surface with the pillars 20 with the inventive friction-reducing geometric surface 22, 42 (as described previously) reducing friction and wear so that a replacement surface would not be needed for some time. On the other hand, pockets 52 (rather than pillars 20) can also be used depending on the nature of the interaction of the fluid and the two sliding surfaces. FIGS. 4 and 8 can be said to show a seal or a bearing pad 50 that is in a lubricated sliding relationship with another surface. The seal or bearing pad 50 defines an area 54 with a contact surface 56 configured for slidingly contacting the other surface, the area 54 including a plurality of structures 20 in predetermined positions within the area 54 and forming at least part of the contact surface 56, each of the plurality of structures 20 including a geometric surface feature 22, 42 which has an entry angle α of less than five degrees. The plurality of structures 20 can be, for example, formed as pillars, projections, holes, pockets, or waves.

Figure 5:
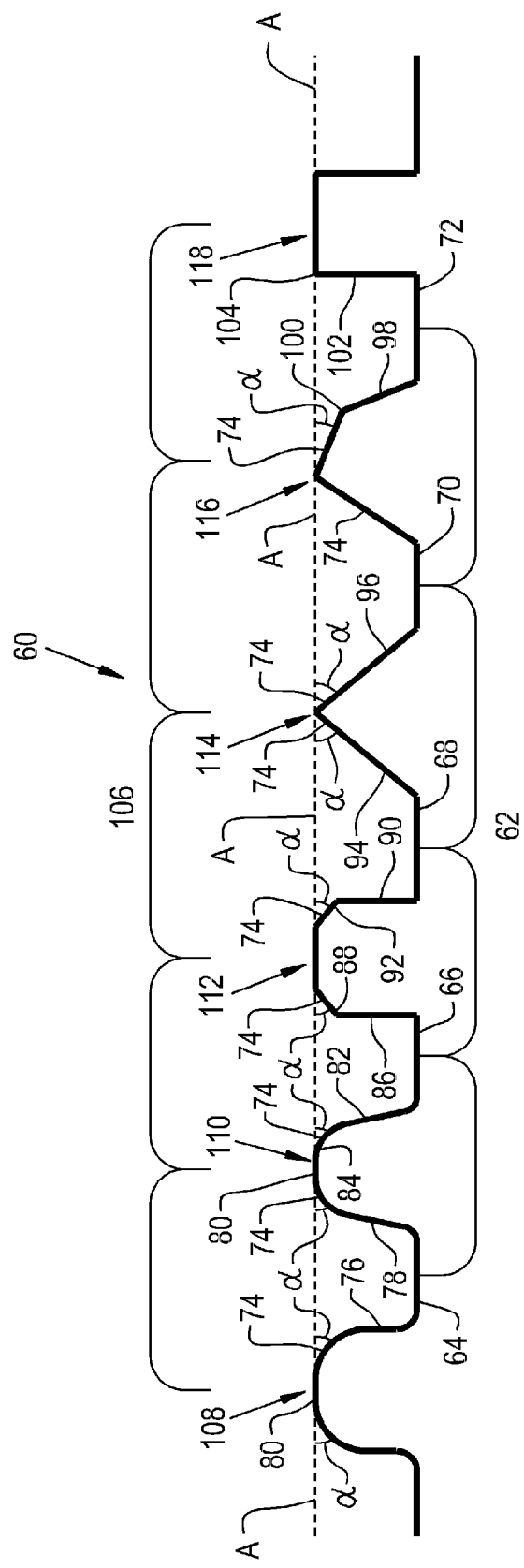
FIG. 5 is a schematic side view of a pad with a plurality of pockets or pads according to the present invention.

FIG. 5 shows a side view of a pad 60 laid down (in the flat, even though the pad 60 itself can have an overall flat shape or a curved shape, depending upon the application) and magnified (the pad 60 of FIG. 5 does not show a cross-section of the pad 50 of FIG. 4). For illustrative purposes, the pad 60 of FIG. 5 is shown to have a plurality of pockets 62 with a variety of shapes; it is understood that a pad 60 may have only one of these shapes for the pockets. FIG. 5 shows pockets 64, 66, 68, 70, 72. Pockets 64, 66, 68, 70, 72 are shown as each having two sides. The sides of pockets 64, 66, 68, and 70 each have a friction-reducing geometric surface feature 74 near the top of the pocket 64, 66, 68, and 70, the angle α indicating the location of this friction-reducing geometric surface feature 74 on each of the pockets 64, 66, 68, 70. The angle α, as above, is less than 5 degrees from a plane A (which is shown in broken lines and is understood to extend across the top of the upraised features in FIG. 5). FIG. 5 shows pocket 64 as having a left side 76 and a right side 78 each with a curved surface 80 (the pocket 64 has such a radius) forming the angle α. FIG. 5 shows pocket 66 as having a left side 82 with a curved surface 84 forming the angle α and a right side 86 with a chamfered surface 88 forming the angle α. FIG. 5 shows that pocket 68 has a left side 90 with a chamfered surface 92 forming the angle α and a generally straight right side 94 which forms the angle α. FIG. 5 shows that pocket 70 has a generally straight left side 96 which forms the angle α. FIG. 5 shows that pocket 72 has a left side 98 with a segment 100 forming the angle α and a right side 102 that rises straight up to form a sharp corner 104, this sharp corner 104 not forming a surface feature according to the present invention. While FIG. 5 is shown primarily to illustrate pockets 64, 66, 68, 70, and 72, FIG. 5 can be alternatively understood to show a cross-sectional view of a wave pattern 106 (the wave pattern 106 can have waves 108, 110, 112, 114, 116, 118 which are similar in geometry or different), the waves 108, 110, 112, 114, 116, 118 extending longitudinally across a surface 60, such as a pad, or the inner diameter (for example) of a ring-shaped seal.

As a wave pattern 106, the raised surfaces between the well of the pockets 64, 66, 68, 70, 72 can be understood to be the waves 108, 110, 112, 114, 116, 118. Neither the individual pockets 64, 66, 68, 70, 72 nor the individual pillars 20 having the angle α according to the present invention have to be symmetrical to achieve the desired results according to the present invention. Further, the pattern of pockets 64, 66, 68, 70, 72 or pillars 20 on a bearing pad does not have to be symmetrical to achieve the desired results according to the present invention. Further, the angle α, which is less than 5 degrees, can vary on an individual pillar or pocket (in other words, depending upon how a pocket is designed, one side of a pocket may have an angle α of 2 degrees and another side of the pocket can have an angle α of 0.5 degrees).

Figure 6:
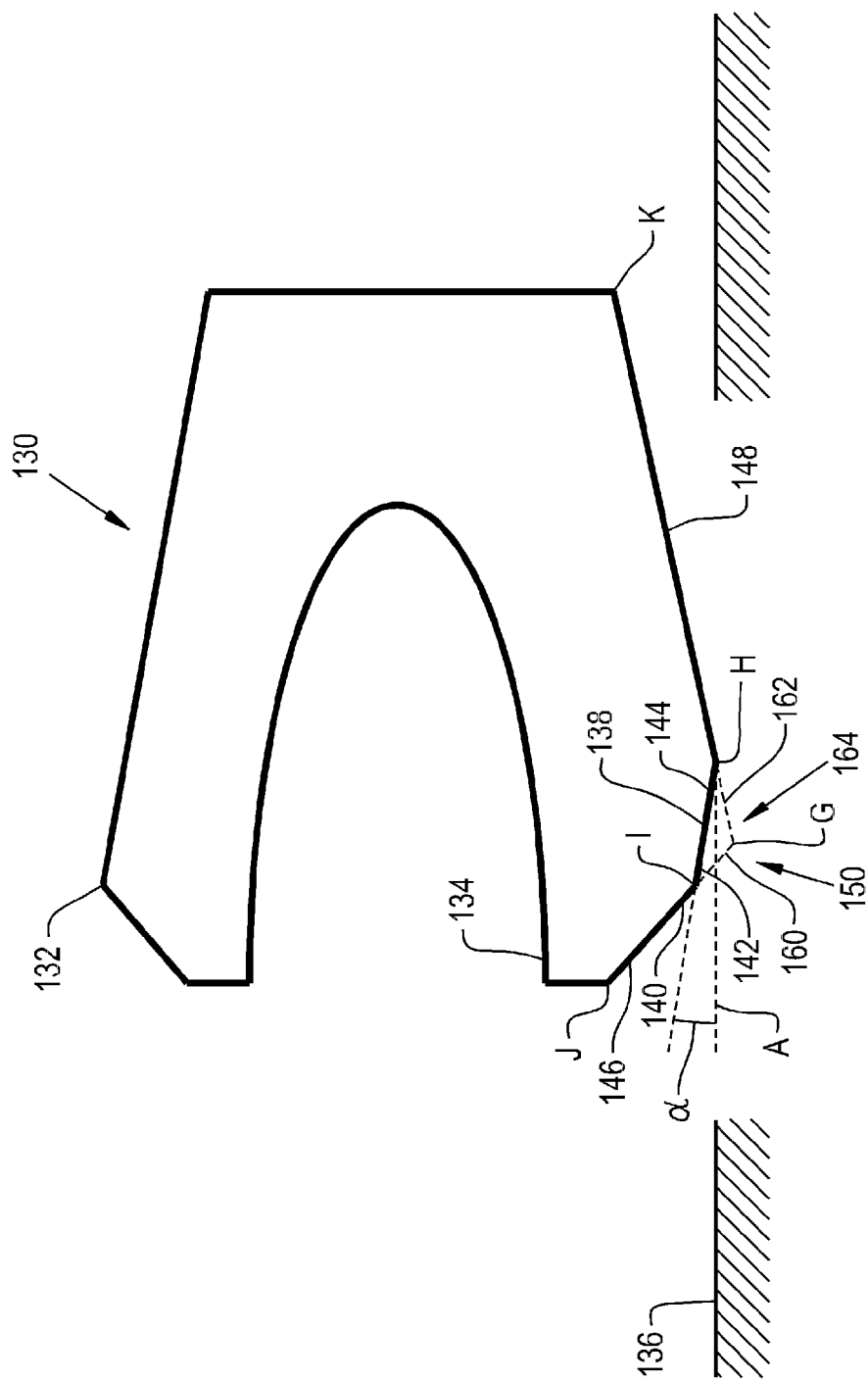
FIG. 6 is a schematic cross-sectional view of a portion of a seal according to the present invention.

FIG. 6 shows yet another embodiment of the present invention. FIG. 6 schematically shows the cross-section of a portion of a seal 130, the seal 130 being formed as an annular ring, the central axis of the seal 130 being below what is shown in FIG. 6. An upper lip 132 is an outer diameter lip that seals against a housing groove, and the inner diameter lip 134 seals or scrapes/wipes against another structure 136, such as an axially reciprocating rod (the axis extending from left to right on the page of FIG. 6); a portion of such a rod 136 is shown in FIG. 6, and FIG. 6 should be understood to provide that the rod 136 extends under the inner diameter lip 134. The seal 130 is installed in a housing groove but, for illustrative purposes, is not shown to be in a compressed condition; it is understood, however, that when installed in a housing groove against a rod 136 the seal 130 would be compressed and thereby form a contact surface 138 on the inner diameter lip 134 of the seal 130 with the rod 136. FIG. 6 shows a seal 130 that is in a lubricated sliding relationship with another surface (the rod) 136, the seal 130 including a contact surface 138 configured for slidingly contacting the other surface. The contact surface 138 includes a geometric surface feature 140 which has an entry angle α of less than five degrees. FIG. 6 schematically shows a buffer seal 130 having an inner diameter lip 134.

FIG. 6 shows two alternative embodiments of the inner diameter lip 134 of the seal 130, the two embodiments of the inner diameter (ID) lip 134 being ID lip A and ID lip B. Regarding ID lip A, FIG. 6 shows that ID lip A has surfaces extending from point J, to point I, to point H, and to point K. The front edge of ID lip A (or, what can be referred to as a leading edge) extends from point J to point I, to point H. ID lip A includes a chamfer 142 which forms the angle α (of less than 5 degrees) with a horizontal line A, the chamfer 142 extending from point I to point H. ID lip A thus has a front edge with a chamfer 142 according to the present invention, or, alternatively, a curve or radiused surface (as described previously). Rather than a contact line, the contact of ID lip A is shown as being a contact plane (from point I to point H) forming an angle α with the horizontal of FIG. 6. The seal 130 with ID lip A can thus have a single edge including the chamfer, curve, or radius. The chamfer 142 from points I to H forms a transition zone on ID lip A. Thus, instead of a contact line, the lip 134 is rounded or chamfered (thus forming a plane) with an entry angle α. FIG. 6 does not show ID lip A in a compressed (installed) condition. However, in such an installed, compressed condition, ID lip A can form a horizontal line (in cross-section in FIG. 6) on one or both sides of point H, this horizontal line extending up an edge 144 running from points H to I (or up an edge 146 running from points I to J) and/or up an edge 148 running from points H to K. For instance, this horizontal line could extend from a point between points I and H to point H; alternatively, this horizontal line could extend from a first point between points I and H to a second point between points H and K; alternatively, this horizontal line could extend from a point between points H and K to point H. Alternatively, this horizontal line could extend from a point between points J and I to point H (or to a point between points H and K). This horizontal line thus forms a contact surface or contact zone 150 (that part of the surface of the inner diameter lip 134 which contacts the rod 136, although a fluid film (not shown) is ideally between the contact surface 150 and the rod 136). Any of the alternative versions of the contact surface 150 can include a plurality of the inventive features (for example, but not limited to, the pillars, projections, pockets, waves, and/or valleys of the present invention as described herein) throughout the contact surface 150, and the edge surfaces 144, 146, 148 outside of the contact surface 150 can include such inventive features as well. In this way, the contact surface 150 on the inner diameter lip 134 includes the inventive features so that the contact surface/zone 150 is lubricated all the way through (throughout) the contact surface/zone 150 (it is possible, but undesirable, for the contact surface/zone 150 to run dry (be unlubricated) at the back end, or at any point of the contact surface/zone 150).

Regarding ID lip B, FIG. 6 shows that ID lip B has surfaces 160, 162 extending from point J, to point G, to point H, to point K (a portion of ID lip B is thus shown in broken lines). The front edge 160 of ID lip B extends from point J to point G. ID lip B has contact point G which forms a contact line extending into the plane of the page of FIG. 6. While FIG. 6 does not show a feature according to the present invention on ID lip B, ID lip B can include a plurality of the inventive features (for example, but not limited to, the pillars, projections, pockets, waves, and/or valleys of the present invention as described herein) on ID lip B; such inventive features on a surface include, but are not limited to, those shown in FIGS. 4 and 8. FIG. 6 does not show ID lip B in a compressed (installed) condition. However, in such an installed, compressed condition, ID lip B can generally form a line (in cross-section in FIG. 6) on one or both sides of point G, this line extending up the edge 160 running from points J to G and/or up the edge 162 running from points G to K. For instance, this horizontal line could extend from a point between points J and G to point G; alternatively, this horizontal line could extend from a first point between points G and J to a second point between points G and K; alternatively, this horizontal line could extend from a point between points G and K to point G. This horizontal line thus forms a contact surface or contact zone 164. Thus, the surface along at least a portion of the edge 160 extending from point G to point J can include a plurality of the inventive features, that portion being at least running from point G (such features may or may not be running all the way to point J). Similarly, the surface along at least a portion of the edge 162 extending from point G to point K can include a plurality of the inventive features (that portion being at least running from point G (such features may or may not be running all the way to point K). In this way, the contact surface 164 on the inner diameter lip 134 includes the inventive features throughout the contact surface/zone 164 so that the contact surface/zone 164 is lubricated all the way through (throughout) the contact surface/zone 164 (it is possible, but undesirable, for the contact surface/zone 164 to run dry (be unlubricated) at the back end (i.e., towards point K from point G) of the contact surface/zone 164), and the edges outside the contact surface/zone 164 can also include the inventive features as well. Thus, in view of FIG. 6 and ID lips A and B, application of the technology of the present invention may be at the "leading edge" of a product or all of the way through a contact zone (i.e., FIG. 6, as described above, can reflect that sharp edge G results in a contact zone that may have the inventive features at the "leading edge" and possibly all of the way through the contact zone).

Figure 7:
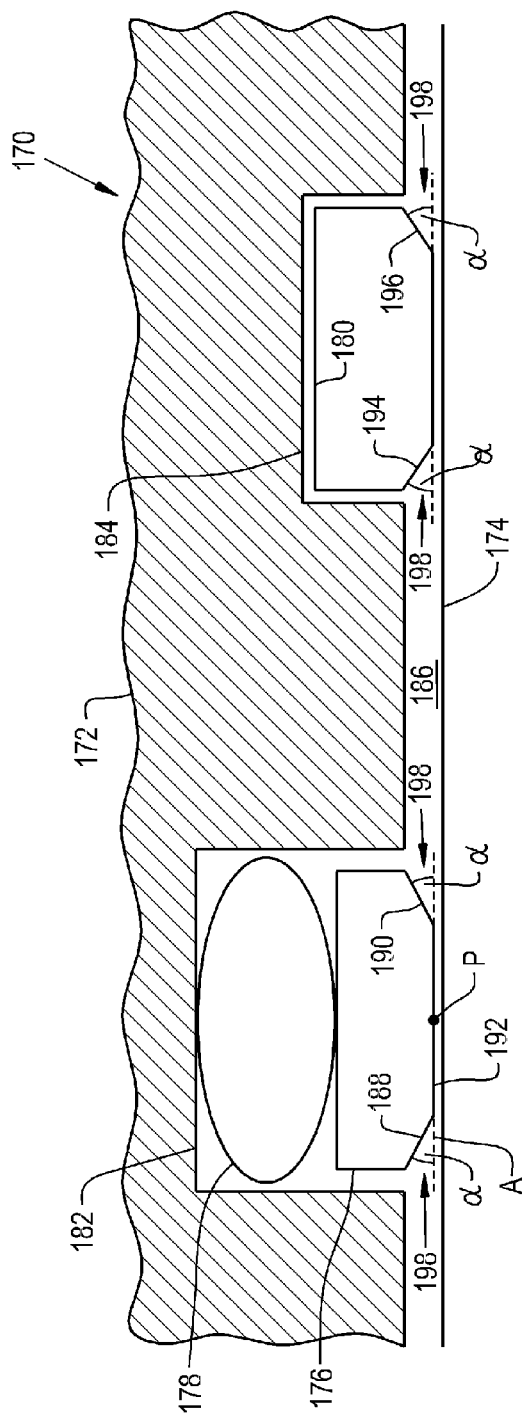
FIG. 7 is a schematic cross-sectional view of a portion of a seal and bearing system according to the present invention.

Referring now to FIG. 7, there is shown a seal and bearing system 170 which generally includes a first structure 172 and a second structure 174. By way of example and not by way of limitation, the first structure 172 can be a housing, and the second structure 174 can be an axially reciprocating rod, as shown in FIG. 7. According to the embodiment of the present invention shown in FIG. 7, the seal and bearing system 170 can further include an annular (ring-shaped) seal 176, an annular O-ring 178, and an annular bearing 180. The rod 174 can slide back-and-forth (left and right in FIG. 7) relative to the seal 176 and bearing 180.

FIG. 7 shows that the housing 170 can, for example, include a first housing groove 182 and a second housing groove 184. Each of the first and second housing grooves 182, 184 has an annular shape formed in the housing 170. The first housing groove 182 has positioned therein the O-ring 178 and the seal 176. The O-ring 178 is positioned radially outwardly of the seal 176. The O-ring 178 can function as an energizer to bias the seal 176 towards the rod 174. The material of the O-ring energizer 178 can be, for example, an elastomer, a plastic, a fluoroplastic, or polytetrafluoroethylene (PTFE); this is provided by way of example and not by way of limitation. The seal 176 can function to seal the gap between the housing 172 and the rod 174. The second housing groove 184 has positioned therein the bearing 180. The bearing 180 can function to maintain a certain distance between the housing 172 and the rod 174. A fluid 186 is positioned within a gap between the housing 172 and the rod 174. The fluid can be a lubricant such as an oil.

The seal 176 of FIG. 7 has two edges 188, 190 with the inventive friction-reducing geometric surface feature. The friction-reducing surface feature is shown as a chamfer extending towards a flat surface 192 (which can be referred to as a plateau) which extends between the two chamfered edges 188, 190 (as described previously, the chamfered edges 188, 190 could be formed with a curve or radius). The seal material (the material which seals against the rod 174) is the material forming each of these chamfered edges 188, 190 and the plateau 192 (the flat part between the chamfered edges 188, 190). Each edge 188, 190 forms an angle α (which is less than 5 degrees) with a line which lies substantially in the plane of the plateau. Similarly, the bearing 180 also includes two chamfers 194, 196 at angle α. As the rod 174 reciprocates back-and-forth, the chamfered edges 188, 190 reduce the friction between the seal 176 and the rod 174, as well as the bearing 180 and the rod 174. Thus, the low entry angle α substantially reduces the friction and thus the wear of the seal 176 and the bearing 180.

Relative to the seal 176 of FIG. 7, the contact area of the seal (the sealing surface 192) can have a plurality of the inventive features (for example, but not limited to, the pillars, projections, pockets, waves, and/or valleys of the present invention as described herein) starting at the inner diameter sealing lip of the seal and progressing through the complete contact zone. FIG. 7 shows the seal 176 with chamfers 188, 190 and a sealing surface 192 and, further, shows the seal 176 after it has been installed in the housing groove 182 adjacent the rod 174. Because the seal 176 is installed, the seal 176 is shown in a compressed condition; FIG. 7 does not show the seal in an uncompressed, uninstalled condition. In the uncompressed, uninstalled condition, the seal 176 can have an inner diameter sealing lip that forms a line contact, which can be, for example, at point P shown in FIG. 7 (the line associated with point P extending into the page of FIG. 7). In other words, in the uncompressed, uninstalled condition, the sealing surface 192 can form an upside down pyramid, the two sides of the pyramid meeting at point P; but, in the compressed, installed condition, the sealing surface 192 can form essentially a straight line (from left-to-right in FIG. 7), as shown in FIG. 7. The angle of the sides of the upside down pyramid can be the same as the chamfer angle α, or can be steeper (greater relative to plane A in FIG. 7) than angle α, or can be less than angle α. Depending upon design considerations, upon the amount of deformation of the inner diameter of the seal 176, and upon the amount of wear of the seal 192, the contact surface 192 (the sealing surface that seals and thus contacts the rod 174, "contact" being used within the sense that a fluid film (not shown) is actually between the seal 176 and the rod 174) can include a portion of the chamfered edges 188, 190. Stated another way, a portion of the chamfered edges 188, 190 can be in a contact zone 198 and a portion of the chamfered edges 188, 190 may not be in the contact zone 198; the portion in the contact zone 198 can be adjacent to the sealing surface 192 shown in FIG. 7, the seal 176 being deformed or worn sufficiently so that part of the chamfered edges 188, 190 now forms part of the sealing surface 192 (which can also be called the contact surface). That is, the chamfered edges 188, 190 may not fully comprise part of the contact zone 198, although it is possible that all of the chamfered edges 188, 190 can form part of the contact zone 198. Thus, in addition to (or instead of) the chamfered edges 188, 190 shown in FIG. 7, the sealing surface 192 may include a plurality of the inventive surface features (the features mentioned previously) throughout the sealing surface 192 (which forms the contact zone 198). Further, the chamfered edges 188, 190 themselves may include additional such inventive surface features formed thereon. This design helps to ensure that the entire contact zone is lubricated.

Pillars and pockets can be formed on a three-dimensional part, such as any wear pad that is flat. Such a wear pad includes a linear, flat bearing. The pillars and pockets (for example, blind holes) can be formed by a repeating machining process, the pockets or holes being formed by a milling operation. The part (for example, a pad, or a ring-shaped seal or bearing) can be extruded out, and, in a second operation, the pillars, holes, or pockets can be formed in the part, such as by machining Wave patterns can be readily formed on a two-dimensional part, such as a seal for a hydraulic cylinder or a bearing for a cylinder (the seals with the inventive geometric surface feature shown in the figures could be formed in this way). The seal or bearing material can be extruded and the wave pattern can be formed in a second operation by lathe turning. Alternatively, the wave profile can be put in an extrusion die and extruded out when the seal or bearing is extruded out of the die. Other manufacturing techniques can be used in forming the features of the present invention (having the surfaces with angle α). Such other manufacturing techniques include, but are not limited to, operations other than machining, such as laser forming, coining, imprinting, roll forming micro-lithography, and chemical or electrochemical etching.

The material of the seal or bearing (including the surface feature of the present invention) can be, for example, rubber (such as reinforced rubber), plastic (such as reinforced plastic), a fluoropolymer, a fluoroplastic, an elastomer, polytetrafluoroethylene (PTFE), or nylon. The material incorporating the surface feature of the present invention can also be a metal, such as stainless steel (for example, a metallic bearing or a metallic button). These materials are provided by way of example and not by way of limitation. Further, the lubricant used with the present invention and thus between sliding surfaces can be, for example, a medium viscosity mineral oil, a water-based oil, an artificial or synthetic oil, or an artificial or synthetic lubricant. The lubricant can be a liquid or a semi-liquid (for example, but not limited to, grease). Further, the features according to the present invention (the features with the low angle α, such as pillars, pockets, or other surfaces) can be macro-scale features, micro-scale features, or nano-scale features, and the number (quantity) and density of these features can vary and be optimized. Further, the present invention covers any type of sliding. For example, such types of sliding include, but are not limited to, reciprocating, rotary, and helical sliding. While the above primarily addresses reciprocating motion (such as a piston rod reciprocating in a cylinder), the present invention also covers applications involving continuously rotating structures (a structure that rotates in one direction) and oscillating rotating structures (a structure that rotates back-and-forth in two directions).

An application of the bearing of the present invention could be as a machine tool bearing surface where sliding occurs between opposing surfaces. A seal of the present invention could be used in this tool as well.

Testing

The following describes testing associated with the present invention.

The geometric feature described is a surface modification which involves forming a very small angle (for example, less than 2 degrees angle) from edges; this surface modification has shown a ten-fold decrease in friction during testing. This technology can be applied to dynamic bearing, dynamic sealing, and their mating surfaces (the hardware against which the bearings and the seals run) like one or more of the ways shown in the figures, or the like. One of the other ways would be to introduce hard and softer segments in the seal or bearing materials with this type of arrangement so that the softer material wears away quickly or deforms to produce this effect (for example, the corners of a pillar can wear away, as shown in the figures, to form the chamfered edge).

A simple geometric feature on a test button sliding on a flat cast iron plate in oil causes a large and unexpected drop in friction. It is thought that this geometric feature allows a load supporting fluid film of oil to be maintained between the contacting surfaces resulting in exceptionally low friction.

Standard lathe turned buttons have produced expected friction results in boundary lubricated conditions with coefficient of friction from 0.05 to 0.07. That button is generally a cylindrical structure with a flat surface on one end (absent sanding on that end, such as shown in the right-most projection in FIG. 5), the flat surface on the end of the test button coming into sliding contact with the flat pad such that the flat surface of the button rubs against the flat surface of the pad or test plate during testing. When buttons were sanded to smooth the flat surface, an unexpected and significant drop in friction took place, with friction coefficient from 0.003 to 0.008. Microscope examination of the sanded buttons revealed that the method of sanding caused the edges of the buttons to be worn away slightly more than the center resulting in a crowned instead of flat shape. Buttons with this shape demonstrate friction coefficients around 0.003 to 0.007 with very tight test-to-test consistency even when the button is made from different materials. The same buttons with a flat shape have friction coefficients from 0.03 to 0.06 with wide test-to-test variation.

Figure 9:
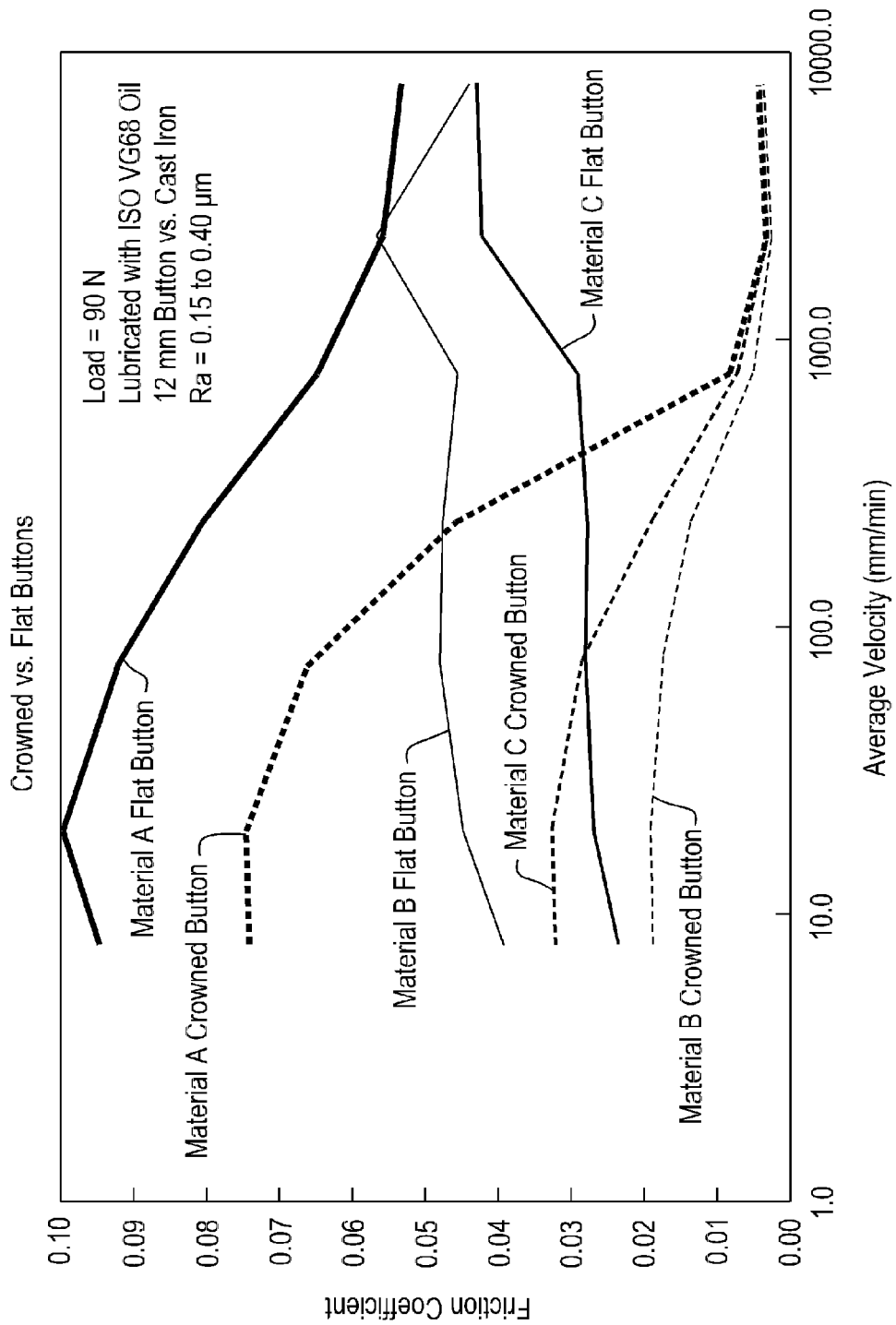
FIG. 9 is a graph illustrating friction coefficients at various velocities for crowned and flat buttons.

FIG. 9 shows test results in the form of a plot of average velocity versus friction coefficient showing the same low friction effect for three different materials when the buttons have a crowned face. The three materials used in the testing reflected in FIG. 9 are material A, material B, and material C. Material A is a highly filled PTFE material. Material B is a medium filled PTFE material. Material C is a lightly filled PTFE material. The present invention (including the unexpected behavior described herein) is not intended to be limited to a particular material but is intended to apply across a range of materials so as not to be material dependent. Each material was tested using a flat button and a crowned button. Each of the broken lines points to a respective crowned button, showing the crowned button after the testing. The upper right hand corner of FIG. 9 shows testing conditions, including a load of 90 N, lubrication between the button and the opposing cast iron surface being a standard petroleum based oil, the test button having a diameter of 12 mm, the surface roughness Ra being 0.15 to 0.40 μm (Ra representing surface roughness of the test button). The load of 90 N is a force pressed down on the test button using a piston and cylinder assembly attached to a flat plat, the flat plate pressing down on the test button. The velocity referenced in the testing is a relative velocity of the opposing surface (for example, the cast iron surface) moving sideways relative to the test button and the surface the test button (a cylinder) is mounted in; for example, the opposing plate can move with this velocity while the test button remains stationary (or the button could move and the opposing plate could remain stationary, or both the opposing plate and the button could move).

FIG. 9 shows the friction coefficient for the three materials (the aforementioned three materials) which all show substantially reduced friction between 500 and 10,000 mm/min velocity when the buttons have a crowned shape. Each line on the plot is the average of four separate tests. The crowned buttons showed evidence of rubbing contact in the center of the buttons but not extending to the edges of the buttons. The lower contact area meant that the test was running with higher pressure, but higher pressure tests on flat buttons did not show the low friction effect.

Figure 10:
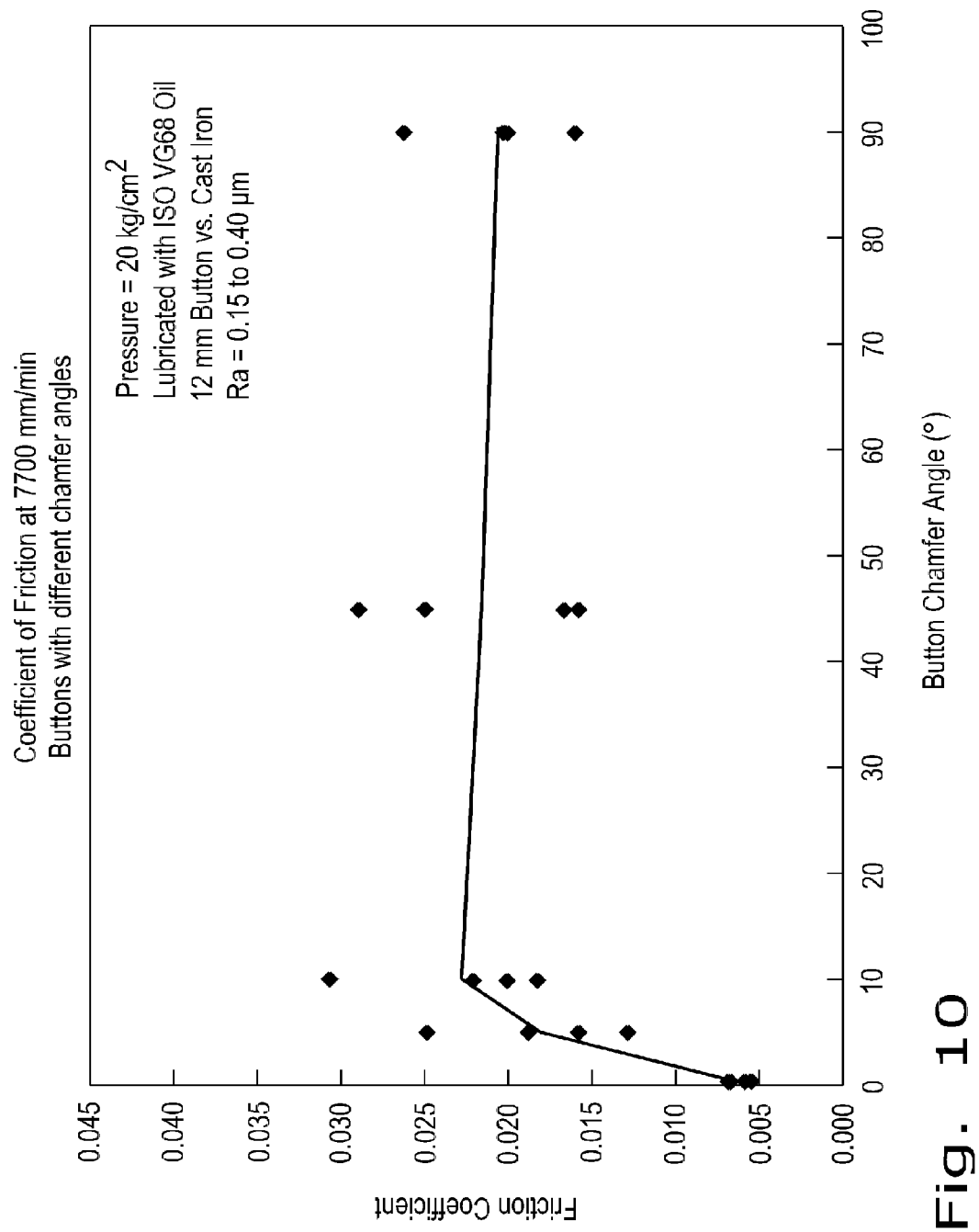
FIG. 10 is a graph illustrating the relationship between friction coefficient and a button's chamfer angle at a fixed velocity.

It was possible to reproduce the low friction effect (without sanding) by machining a chamfer on the button edges (as shown in FIG. 10). Buttons were machined with different chamfer angles while maintaining the same contact area. Low friction resulted only when the chamfer angle (departure angle from the flat rubbing face, the departure angle also being called the entry angle previously) was about 0.5 degrees. The friction increased to normal/expected levels when the chamfer angle was about 5 degrees. The unexpected low friction does not occur gradually or proportionally with chamfer angle but, rather, happens suddenly when the chamfer angle is below about 5 degrees.

FIG. 10 shows test results in the form of a plot of the button chamfer angle versus friction coefficient. Each of the diamond points indicates individual test data. The solid red line indicates the average data of the individual test data. The plot of FIG. 10 shows that the friction drops off quickly when the chamfer lead-in angle is below 5 degrees.

During normal running, the button may eventually wear to the point where there is full rubbing contact to the edges of the button, but with the low-angle chamfered edges (as disclosed herein) the friction and wear rate are so low that 100 hours of running was not able to significantly increase the rubbing contact area. The geometry appears to encourage a full fluid film of oil, and there is little actual contact of button and plate. It is believed that when there is not a very small lead-in chamfer, the edges of the button either perform a scraping function or create fluid turbulence, either of which will disrupt a load supporting fluid film. The low-angle chamfer provides a ramp type entry zone for fluid to be fed under the button. Instead of scraping or creating turbulence, the low-angle chamfer causes the button to lift up on top of the fluid film as it is moving.

This testing was done with 90 N of force on a 12 mm diameter button. Regarding oil viscosity (the lubricant being oil), testing has been done with 32, 68, and 220 centistoke viscosities, all of which demonstrated the reduced friction with the inventive features described herein (the low-angle features).

According to the present invention, buttons and surfaces other than buttons are used to obtain the low friction effect. For instance (as indicated above) a large flat bearing pad can be formed with multiple contact areas, each contact area being bounded by a low angle transition or feed-in region surrounding the respective contact area.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing or bearing structure for sealing or separating moving surfaces, comprising:
   a main body defining a body axis therethrough;
   a contact surface configured for slidingly contacting another surface, said contact surface defining a contact axis that is parallel to said body axis; and
   at least one geometric surface feature located between said body axis and said contact axis, said at least one geometric surface feature having an entry angle that is less than 3 degrees and at least 0.5 degrees relative to said contact axis.

2. The sealing or bearing structure according to claim 1, wherein said at least one geometric surface feature is one of a chamfered edge, a symmetrical curved edge and an asymmetrical curved edge.

3. The sealing or bearing structure according to claim 1, wherein said sealing or bearing structure is one of a pillar, an annular seal, an annular bearing, and a pad.

4. The sealing or bearing structure according to claim 1, wherein said entry angle is between approximately 0.5 to 2 degrees relative to said contact surface.

5. The sealing or bearing structure according to claim 1, wherein said at least one geometric surface feature comprises a plurality of geometric surface features, each of said plurality of geometric surface features being identical.

6. The sealing or bearing structure according to claim 1, wherein said at least one geometric surface feature comprises a plurality of geometric surface features, wherein at least one of said plurality of geometric surface features has an entry angle that is different than an entry angle of another one of said plurality of geometric surface features.

* * * * *